United States Patent Office
3,393,181
Patented July 16, 1968

3,393,181
STABILIZED POLYARYLSULFONE POLYMERS
AND PROCESS
Herward A. Vogel, Oakdale Township, Washington County, Minn., assignor to Minnesota Mining and Manufacturing Company, St. Paul, Minn., a corporation of Delaware
No Drawing. Filed Oct. 23, 1965, Ser. No. 504,137
6 Claims. (Cl. 260—79.3)

ABSTRACT OF THE DISCLOSURE

Process for stabilizing polyarylsulfone or polyarylsulfone ether polymers by contacting finely divided polymer or a solution of polymer in a suitable solvent with an aqueous or organic solvent solution of alkali metal or alkaline earth metal compound which is capable of undergoing double decomposition with sulfonic acid or sulfonyl halide groups to form a metallic sulfonate, recovering the polymer and washing to remove excess metal compounds. The resulting polymers are thermally stabilized, e.g., films of polymer are resistant to change in color on heating.

This invention relates to polyarylsulfone polymers and copolymers, and more particularly to such polymers stabilized against degradation by heat, and to processes for accomplishing such stabilization.

Polyarylsulfone polymers possess useful properties, including the capability of being formed into films and fibers, and having useful dielectric strength, together with high melting point. Thus, they significantly advance the temperature at which synthetic polymers can be employed for various purposes; but they have a number of disadvantages when an attempt is made to employ them at the upper limits of their heat-stable range. At this point, the materials commonly become dark colored, become crosslinked, and lose their strength. This happens at or somewhat above the temperature at which the materials melt, and therefore is detrimental to fabricating shaped articles of such polymers from the molten state.

It is an object of this invention to provide a process by which polyarylsulfone polymers can be stabilized. It is a further object of the invention to provide stabilized polyarylsulfone polymers which are useful at higher temperatures. Other objects will be apparent from the disclosures herein made.

In accordance with these objects, it has been found that polyarylsulfone polymers can be stabilized by treating them with an alkali or alkaline earth metal in the form of a base or salt thereof with a weak acid, or derivatives soluble in organic solvents. In this way, the metal is in some way incorporated into the polymer, most probably by converting the sulfonic acid or sulfonyl halide terminal groups which are present to metallic sulfonate salts. Surprisingly, this simple treatment brings about a marked improvement in the behavior of the polymers toward heating at temperatures near the melting point. The high temperature aging properties of polyarylsulfones thus treated are greatly improved, as is their stability during melt processing.

The polyarylsulfone and polyaryloxysulfone polymers treated and stabilized by the process of the invention are, e.g., those described in Belgian Patent No. 639,636 and in my copending U.S. applications Ser. No. 273,290, filed Apr. 16, 1963; and Ser. No. 280,091, filed May 13, 1963, now U.S. Patent No. 3,321,449. These polymers are made by condensation of monomers and comonomers which have one or more sulfonyl halide functional groups and therefore the polymer chains have sulfonic acid or sulfonyl halide terminal groups.

In a first embodiment of the process of the invention, the stabilized polyarylsulfone polymers of the invention are formed by treating the polymers in organic solvent solution with an organic solvent solution of the selected alkali metal or alkaline earth metal base or solvent-soluble derivative.

In a second embodiment of the process of the invention, the polymer in solid state is treated with a solution of the selected metal base, salt or derivative. The polymer is contacted with the solution for a period of time sufficient to effect at least a useful, significant degree of stabilization. The polymer is then removed from the solution, washed with a solvent and dried.

It is believed that in either process a significant number of the terminal groups in the polymer molecule are converted into metal sulfonate groups.

The alkali metal or alkaline earth metal compound which is used can be any metallic compound capable of undergoing double decomposition with sulfonic acid or sulfonyl halide groups, to form a metallic sulfonate. Thus, for example, mineral bases, such as sodium hydroxide, lithium hydroxide, potassium hydroxide, strontium hydroxide, magnesium hydroxide, calcium hydroxide; salts of such bases with weak acids, e.g., sodium carbonate, calcium acetate, magnesium benzoate and the like are useful in this process; also oxides, e.g., sodium oxide, potassium oxide, calcium oxide, and the like. The metals themselves can also be used, but it is more convenient to use derivatives like salts or bases, which are more easily handled.

Other derivatives, such as sodium methoxide, sodium phenoxide, lithium methoxide, sodium butoxide, magnesium methoxide and the like can be used.

In carrying out the embodiment of the process in which solid materials are treated, it is preferable that the polymer be relatively finely divided form, to speed up the process. In many cases the polymer is precipitated from solution during its preparation and thus is obtained in fluffy, powdery form. The solid polymer may be comminuted by grinding if necessary. Alternatively, however, films, filaments, sheets and other shapes of the polymer can be treated after fabrication, although longer time periods are ordinarily required. Effective or significant stabilization is usually accomplished by soaking the powdered polymer for ½ to 1 hour at temperatures in the range of about 25° to 100° C. or even higher in the solution used, e.g., an aqueous solution of a water-soluble metal derivative. The concentration of metallic compounds in these solutions can be from 1 to 10 percent by weight, preferably 1 to 5 percent, but the concentration is not critical because the polymer after treatment is washed to remove any excess of treating agent.

The preferred embodiment of the process of the invention is that in which the polymer is dissolved in an organic solvent and the metallic compound is likewise dissolved in an organic solvent the same as or compatible with that used for the polymer, and the solutions are mixed.

The metal derivative is preferably dissolved in a solvent which is chemically inert toward the ingredients which are to be used, and the polymer solution is mixed with this solvent. Usually about 0.5 weight percent of the metal derivative, with respect to the polymer to be treated, is used, based on the weight of polymer to be treated, but amounts ranging from about 0.25 to 5 weight percent are useful for the purpose. Where large proportions of strong bases, e.g., methoxides or hydroxides of alkali metals, are used, polymer scission may occur together with some discoloration of certain polymers. To avoid these undesirable results, smaller amounts of these agents, in the range of 0.25 to 0.5 weight percent, are employed. The temperature is also kept below about 70° C. The small amounts of metal compound used appear to react completely or nearly so, and small excesses do not need to be removed from the polymer, as they do not interfere with later fabrication processes, or with the uses of the fabricated polymer. Reaction apparently takes place very quickly even at room temperature.

Useful solvents for the polymers, for the purpose of the first and preferred embodiment of the process, are nitrobenzene, dimethylformamide, dimethylsulfoxide, tetrachloroethane and the like. Solvents compatible with these, in which the metallic methoxides, phenoxides, etc. can be dissolved for this purpose, are alcohols, phenols, dimethylformamide and the like. The amounts and types of solvents should be so chosen that precipitation of the polymer to any substantial extent during treatment is avoided.

Conveniently this process is employed directly with polymer reaction mixtures where a solvent has been used during polymerization, without precipitation and recovery of the polymer. Any hydrogen halide present is preferably removed from the polymerization mixture by degassing in vacuo. Catalyst need not be removed unless it is of a type which produces undesirable discoloration in the polymer.

The following examples will illustrate the process of the invention and the useful results obtained thereby. All parts are by weight unless otherwise specified.

Example 1

A biphenyl-phenyl ether sulfone copolymer is prepared from a mixture of 74 g. of diphenyl ether disulfonyl chloride, 30.89 g. of biphenyl and 50.55 g. of biphenyl monosulfonyl chloride dissolved in 200 g. of nitrobenzene, by reaction with 750 mg. of indium trichloride catalyst at 130° C. for 48 hours. A polymer with inherent viscosity=0.54 is obtained. The viscous polymer mixture is diluted with 115 g. of nitrobenzene, allowed to cool to 60° C. and degrassed by application of reduced pressure using a water-driven aspirator. A 270 g. portion of this solution (containing 90 g. of polymer) is then treated with 450 mg. of sodium methoxide dissolved in 4 ml. of methanol. The base solution is slowly mixed into the viscous polymer solution and allowed to interact with the polymer for 30 minutes at 60° C. The polymer mixture is then diluted further with 135 g. of dimethylformamide and used as such for the casting of films.

For comparison, the residual 180 g. of untreated polymer solution is diluted with 90 g. of dimethylformamide and also used for the casting of films.

Comparison of films of the two portions, each aged for 2 weeks at 315° C., shows that the base-treated polymer remains colorless and tough and flexible, whereas the untreated film sample becomes brown and brittle. On aging for 10 weeks at 600° F. the treated film retained 50 percent of its original tensile strength, while the untreated polymer film had already lost 50 percent of its original strength after only 2 weeks at this temperature.

Example 2

A solid polymer prepared by the reaction of 94 parts of diphenyl ether disulfonyl chloride, 64 parts of biphenyl monosulfonyl chloride and 39 parts of biphenyl, in nitrobenzene solution and using 1 part of indium trichloride, was treated by the process of the invention. The polymer had been precipitated from solution after completion of polymerization, by pouring the reaction mixture into methanol. In this way the polymer was obtained in fluffy, powdery form having inherent viscosity about 0.66 and melting at about 350° C. Polymer which is obtained in the form of large solid pieces can be ground into particles, e.g., of the order of that which will pass U.S. Standard Sieve size No. 18 (1 mm. mesh size).

About 50 parts of polymer are mixed with about 250 parts of a 1 percent aqueous solution of sodium hydroxide. The mixture is stirred slowly for about 1 hour at 60° C. Thereafter the aqueous alkali is removed by filtration, and the polymer is washed twice with 250 parts of distilled water, and dried. The polymer thus prepared can be melted at 350° C. without significant darkening. The polymer can be shaped by melt-extrusion, e.g., into rods or tubes. Untreated polymer becomes black if maintained above its melting point for several hours or longer.

Example 3

Approximately 20 g. samples of the polyarylsulfone polymer used in Example 2 are treated with various metal derivatives according to the procedures of Examples 1 or 2 above, and films are prepared from the treated samples by solution casting from dimethylformamide solution. The solvent in which the metallic compound is dissolved, and used for treatment of the polymer is shown in the table below. The polymers when in solution are dissolved in a mixture of nitrobenzene and dimethylformamide. For comparison, the films are aged for 2 weeks at 315° C., in air. Color changes are rated on a scale of merit in which black char is 1, brown is 6 and colorless is 10. Slight coloring is 9; distinct yellowing is 8. These color changes are indicative of the extent of degradation on heating, and the loss in toughness of the film on such degradation. Results are set forth in the table.

TABLE I

| Treating Agent | Solvent | Color after heating |
| --- | --- | --- |
| None | | 5–6 |
| Sodium methoxide | Methanol | 10 |
| Sodium phenoxide | Phenol | 10 |
| Sodium hydroxide | Water | 9 |
| Lithium methoxide | Methanol | 9–10 |
| Magnesium methoxide | do | 9–10 |
| Magnesium benzoate | Dimethylformamide | 9 |
| Sodium hydroxide | Water [1] | 9 |
| Sodium carbonate | do.[1] | 9 |
| Lithium hyroxide | do.[1] | 9 |
| Calcium acetate | do.[1] | 9 |

[1] Polymer washed with 2 percent solution in solid state just after precipitation, for about 30 minutes, then washed with water.

What is claimed is:

1. In a process for stabilization of polyarylsulfone polymer or polyaryloxysulfone polymer, said polymers having terminal groups containing sulfonyl halide or sulfonic acid groups, the step which comprises contacting the polymer, with or without removal of polymerization catalyst, with alkali metal or alkaline earth metal or oxide, hydroxide, salt of weak acid, alkoxide or aryloxide of an alkali metal or alkaline earth metal, in the presence of an inert solvent, for at least that period of time sufficient to confer significant improvement in thermal stability upon said polymer.

2. In a process for stabilization of polyarylsulfone polymer or polyaryloxysulfone polymer, said polymers having terminal groups containing sulfonyl halide or sulfonic acid groups, the step which comprises contacting the polymer, with or without removal of polymerization catalyst, with alkali metal or alkaline earth metal or oxide, hydroxide, salt of weak acid, alkoxide or aryloxide of an alkali metal or alkaline earth metal, in the presence of an inert organic solvent, for at least that period of time sufficient to confer significant improvement in thermal stability upon said polymer.

3. In a process for stabilization of polyarylsulfone polymer or polyaryloxysulfone polymer, said polymers having terminal groups containing sulfonyl halide or sulfonic acid groups, the step which comprises contacting the polymer, with or without removal of polymerization catalyst, with sodium or sodium oxide, hydroxide, salt of weak acid, alkoxide or aryloxide in the presence of an inert solvent, for at least that period of time sufficient to confer significant improvement in thermal stability upon said polymer.

4. A thermally stabilized polyarylsulfone polymer or polyaryloxysulfone polymer, said polymers prior to stabilization having terminal groups containing sulfonyl halide or sulfonic acid groups, containing a sufficient amount of alkali metal or alkaline earth metal to substantially prevent color change in a film of the said polymer on aging for at least 2 weeks at about 315° C.

5. A thermally stabilized polyarylsulfone polymer or polyaryloxysulfone polymer, said polymers prior to stabilization having terminal groups containing sulfonyl halide or sulfonic acid groups, containing an amount of sodium sufficient to substantially prevent color change in a film of the said polymer on aging for at least 2 weeks at about 315° C.

6. Thermally stable biphenyl-diphenyl ether sulfone copolymer containing a sufficient amount of alkali metal or alkaline earth metal to prevent substantial color change in a film of the said polymer on aging for at least 2 weeks at about 315° C.

References Cited
UNITED STATES PATENTS

| | | | |
|---|---|---|---|
| 2,321,891 | 6/1943 | Berchet | 260—79.3 |
| 2,735,841 | 2/1956 | Allen et al. | 260—79.3 |
| 2,757,163 | 7/1956 | Bowens | 260—45.85 |
| 2,764,576 | 9/1956 | Blaser et al. | 260—79.3 |
| 3,320,218 | 5/1967 | Levine | 260—79.3 |

DONALD E. CZAJA, *Primary Examiner.*

M. J. WELSH, *Assistant Examiner.*

UNITED STATES PATENT OFFICE
CERTIFICATE OF CORRECTION

Patent No. 3,393,181

July 16, 1968

Herward A. Vogel

It is certified that error appears in the above identified patent and that said Letters Patent are hereby corrected as shown below:

Column 1, line 65, "639,636" should read -- 639,634 --.

Signed and sealed this 24th day of February 1970.

(SEAL)
Attest:

Edward M. Fletcher, Jr.
Attesting Officer

WILLIAM E. SCHUYLER, JR.
Commissioner of Patents